United States Patent [19]

Adams et al.

[11] 4,357,842
[45] Nov. 9, 1982

[54] APPARATUS FOR SHARPENING A COMBINATION SAW BLADE

[76] Inventors: James A. Adams, 5 Brightside Ave.; Paul P. Ravinski, Grove St., both of Kingston, Mass. 02364

[21] Appl. No.: 223,128

[22] Filed: Jan. 7, 1981

[51] Int. Cl.³ .............................................. B23D 63/14
[52] U.S. Cl. ........................................................ 76/41
[58] Field of Search .................... 76/37, 39, 40, 41, 75

[56] References Cited

U.S. PATENT DOCUMENTS

| | | | |
|---|---|---|---|
| 2,835,146 | 5/1958 | Vollmer | 76/41 |
| 2,865,233 | 12/1958 | McLaren | 76/41 |
| 4,018,107 | 4/1977 | Stier | 76/41 |

*Primary Examiner*—Roscoe V. Parker

[57] ABSTRACT

Apparatus for sharpening a combination saw blade, the apparatus including a selector for manual input of numbers of cutting teeth and non-cutting tooth spaces on the blade, a counter for counting the number of teeth and tooth spaces moved to a grinding station, the grinding station having a grinding head disposed therein and mounted on a first reciprocating lift mechanism activated by a cam to sharpen each of the blade teeth serially, and a second lift mechanism adapted to operate in response to a signal from the counter to locate the grinding head out of a grinding position when the grinding station is occupied by a non-cutting tooth space, and to place the grinding head under control of the first lift mechanism when the grinding station is occupied by a cutting tooth.

3 Claims, 9 Drawing Figures

APPARATUS FOR SHARPENING A COMBINATION SAW BLADE

BACKGROUND OF THE INVENTION

1. Field of the Invention

The invention relates to saw blade sharpening devices and is directed more particularly to apparatus for sharpening combination saw blades.

2. Description of the Prior Art

Automatic machines for sharpening saw blades are well known in the art. The machines include a rotary grinding head which is reciprocally moveable into and out of engagement with regularly spaced cutting teeth on the blade. The blade is conventionally mounted on a spindle which permits rotation of the blade incrementally, to bring the cutting teeth into position for engagement with the grinding head.

Blades generally referred to as "combination" blades, include a series of cutting teeth, usually followed by a "raker" tooth, which is essentially a cleaning tooth and is generally preceded by a "gullet" or deep depression into which cuttings may fall and be retained briefly before falling from the blade. The raker tooth is shaped differently from the cutting teeth and, of course, the gullet is shaped entirely differently from either the cutting teeth or raker teeth. Because of the interrupted configuration of the periphery of the combination blade, the ordinary automatic machines are not adapted to sharpen such blades and it is customary to sharpen the blades by hand, a procedure which usually reduces the geometrical precision of the blade.

There is a need for apparatus which may be used in combination with a regular automatic sharpening machine and adapt the machine to the automatic sharpening of combination blades.

SUMMARY OF THE INVENTION

It is, therefore, an object of the present invention to provide apparatus which is adapted for operation with existing automatic sharpening machines, the apparatus providing the machine with the capability of automatically sharpening combination blades.

With the above and other objects in view, as will hereinafter appear, a feature of the present invention is the provision of an apparatus for sharpening a combination saw blade, the apparatus including a selector means for manual input of numbers of cutting teeth and non-cutting tooth spaces on the saw blade, a counter means for counting the number of teeth and tooth spaces moved to a grinding station, the grinding station having a grinding head disposed therein and mounted on a first reciprocating lift mechanism actuated by a cam to sharpen each of the blade teeth serially, and a second lift mechanism adapted to operate in response to a signal from the counter to locate the grinding head out of a grinding position when the grinding station is occupied by one of the non-cutting tooth spaces, and to place the grinding head under control of the first lift mechanism when the grinding station is occupied by a cutting tooth.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENT

Figure 1:
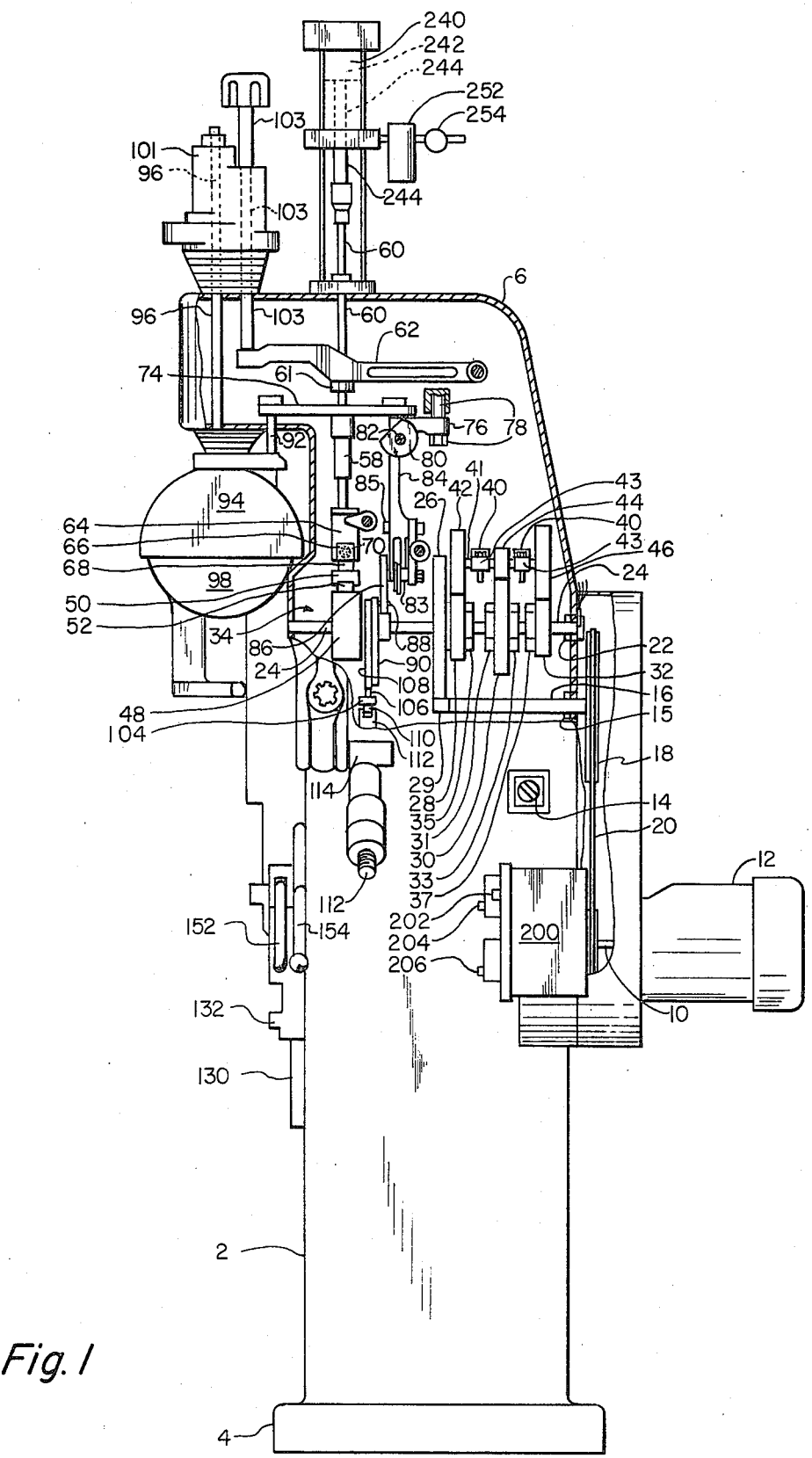
FIG. 1 is a side elevational view, partly broken away and partly in section, of one form of sharpening machine illustrative of an embodiment of the invention.

Referring to the drawings, it will be seen that an illustrative sharpening machine includes a lower housing 2 upstanding from a base means 4, and an upper housing 6 disposed above the lower housing 2. Fixed to the lower housing 2 is a first bearing means (not shown) supporting a first shaft 10. The first shaft 10 is connected to an electric motor 12 which may be energized by an appropriate electrical switch 14 mounted on the lower housing 2.

A second bearing means 15 disposed in the lower housing 2 supports a second shaft 16 which carries at one end thereof a drive wheel 18. A drive belt 20 interconnects the first shaft 10 and the drive wheel 18, whereby operation of the motor 12 causes rotation of the first shaft 10, movement of the drive belt 20 and drive wheel 18, and thereby rotation of the second shaft 16.

The lower housing 2 includes a third bearing means 22 supporting a third shaft 24 on which is rotatively disposed a drive gear 26 to which is fixed a first rotary gear 28. The drive gear 26 and the first rotary gear 28 are freely rotatable on the third shaft 24. A second rotary gear 30 is keyed to the third shaft 24 in such manner as to permit the second rotary gear to move lengthwise along the third shaft 24, but to turn with the shaft 24. A third rotary gear 32 is disposed on the shaft 24 and is freely rotatable thereon. The second rotary gear 30 is provided on either side thereof with key means 31, 33, respectively, interlockingly engageable with complementary key means 35, 37 on the first and third rotary gears 28, 32. Also disposed on the third shaft 24 is a cam assembly 34, which will be described hereinbelow. Extending from the second shaft 16 is a worm gear 29 threadedly engaged with the drive gear 26. Thus, rotation of the second shaft 16 is transmitted to the drive gear 26 and the first rotary gear 28 which are free to rotate on the third shaft 24.

Figure 2:
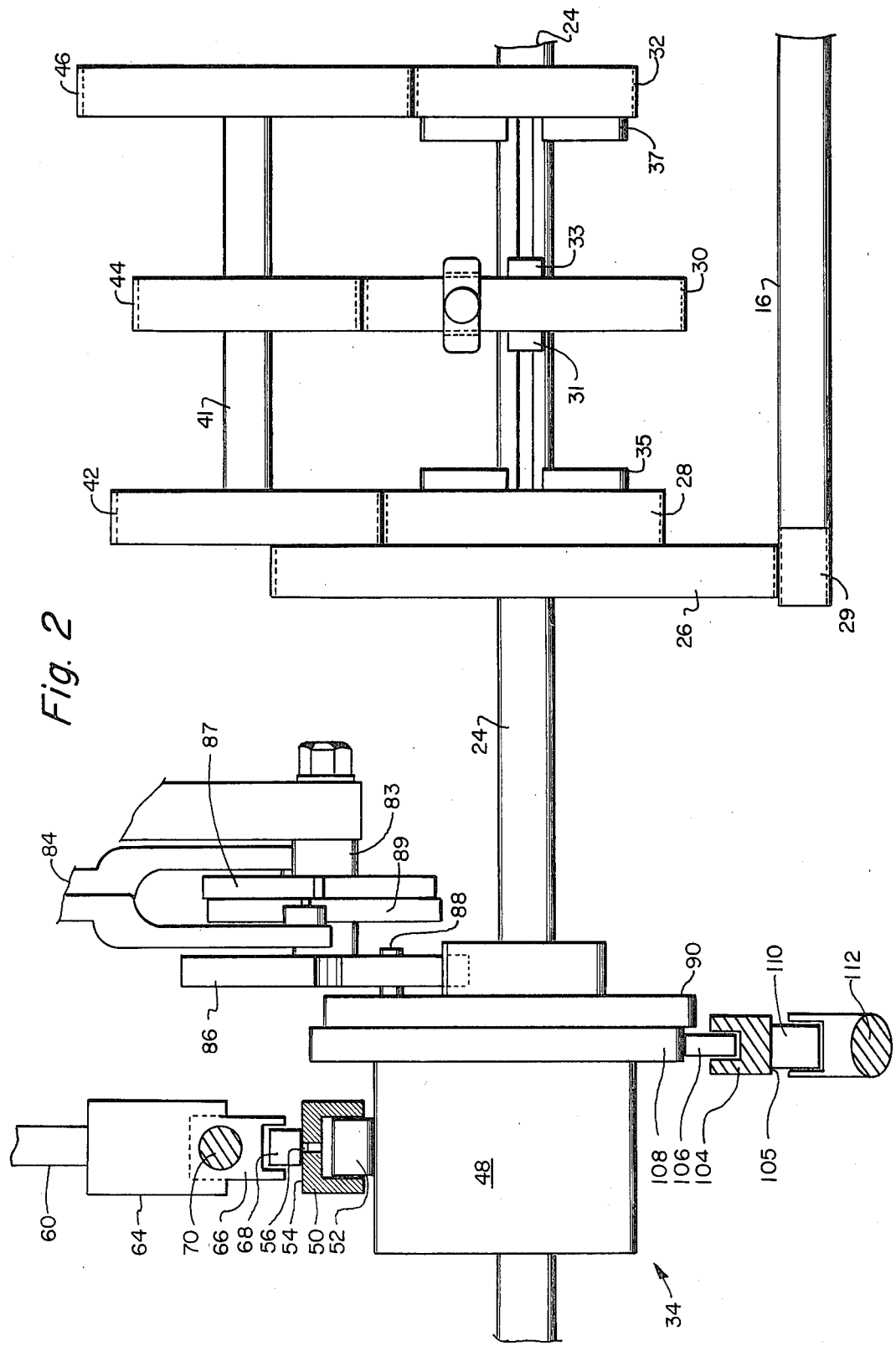
FIG. 2 is an enlarged elevational view, partially diagrammatic, of gear train and cam portions of the machine.
Figure 4:
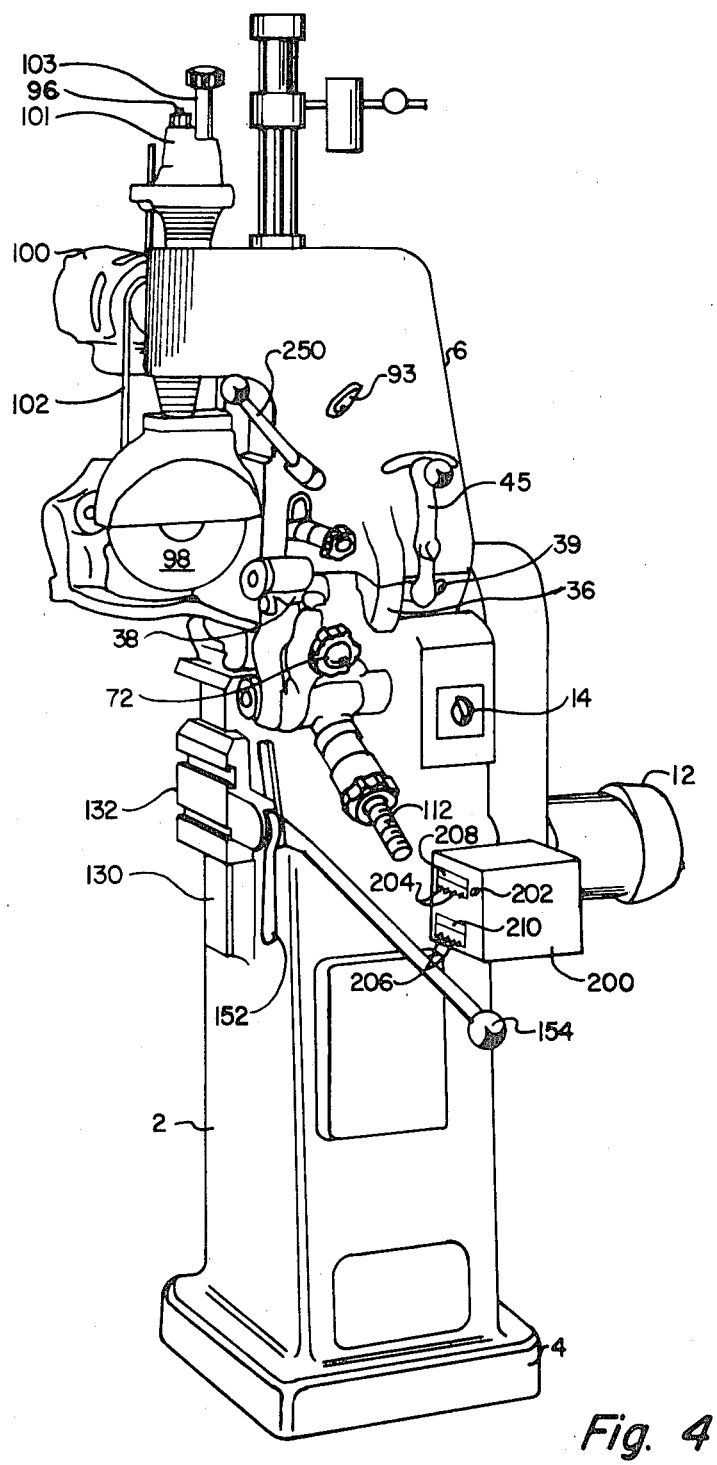
FIG. 4 is a perspective view of the machine.

Supported by the third bearing means 22 are a gear housing 36 (FIG. 4) and a cam housing 38. Fixed to the gear housing 36 are support members 40 (FIG. 1) which retain a fourth bearing means 43 in which is disposed a fourth shaft 41 (FIGS. 1 and 2). Fourth, fifth and sixth rotary gears 42, 44, 46, are fixed to the fourth shaft 41, the fourth rotary gear 42 being in meshing engagement with the first rotary gear 28, the fifth rotary gear 44 being positioned for meshing engagement with the second rotary gear 30, and the sixth rotary gear 46 being in meshing engagement with the third rotary gear 32. The gear housing 36 is provided with an opening 39 therein (FIG. 4), a lever 45 extending through the opening 39 and being adapted to move the second rotary gear 30 (FIG. 2) to a selected one of three positions. In a first position (not shown), the second rotary gear 30 is disposed adjacent the first rotary gear 28, and by way of the key means 31, 35 is locked with the first rotary gear 28. In such arrangement, the rotation of the first rotary gear 28 is transmitted directly to the second rotary gear 30 and thence to the third shaft 24. In a second position (illustrated), the second rotary gear 30 is in meshing engagement with the fifth rotary gear 44. In such instance, the rotation of the first rotary gear 28 is transmitted to the fourth rotary gear 42, which is fixed to the fourth shaft 41, causing rotation of the fifth rotary gear 44, also fixed to the fourth shaft 41, causing rotation of the second rotary gear 30, and thereby the third shaft 24. In a third position (not shown), the second rotary gear 30 is in locking engagement with the third rotary gear 32, by way of the key means 33, 37. In such arrangement, rotation of the first rotary gear 28 is transmitted to the fourth rotary gear 42 and the fourth shaft 41, causing rotation of the sixth rotary gear 46 and thereby the third and second rotary gears 32, 30, and thereby the third shaft 24.

The selection of gears is dependent upon the speed of rotation of the third shaft 24 desired by the operator.

The cam assembly 34 (FIGS. 1 and 2) includes a rotary cam member 48 mounted on the third shaft 24. Pivotally mounted in the cam housing 38 is a rocker arm 50 having a cam follower 52 fixed thereto, the cam follower being in engagement with the periphery of the rotary cam member 48. Thus, upon rotation of the third shaft 24, rotation of the cam member 48 causes pivotal movement of the arm 50. An upper surface 54 of the rocker arm 50 is planar and has therein an elongated groove 56 which retains lubricating oil.

Disposed above the gear and cam housings 36, 38 is the upper housing 6 in which is mounted a sleeve member 58 in which is slidingly disposed a vertical shaft 60, which supports a pivotally mounted arm 62 extending transversely of the shaft 60. At the lower end of the vertical shaft 60 there is fixed a guideway 64 in which is slidingly disposed a carrier 66 which supports a cam follower 68. A threaded shaft 70 extends through the carrier 66 and is turnable by a knob 72 (FIG. 4) to cause the carrier 66, and thereby the cam follower 68, to move lengthwise of the guideway 64. Such movement of the cam follower operates to place the follower on the surface 54 of the rocker arm 50 selectively nearer to, or further from, the pivot mounting of the rocker arm.

As the rocker arm 50 moves vertically in response to the cam member 48, it causes vertical movement of the vertical shaft 60, and thereby, by way of a collar 61 fixed on the shaft 60 (FIG. 1), vertical movement of the arm 62. It will be apparent that by manipulation of the knob 72, the operator is able to selectively determine the extent of the vertical movement of the shaft 60.

Figure 3:
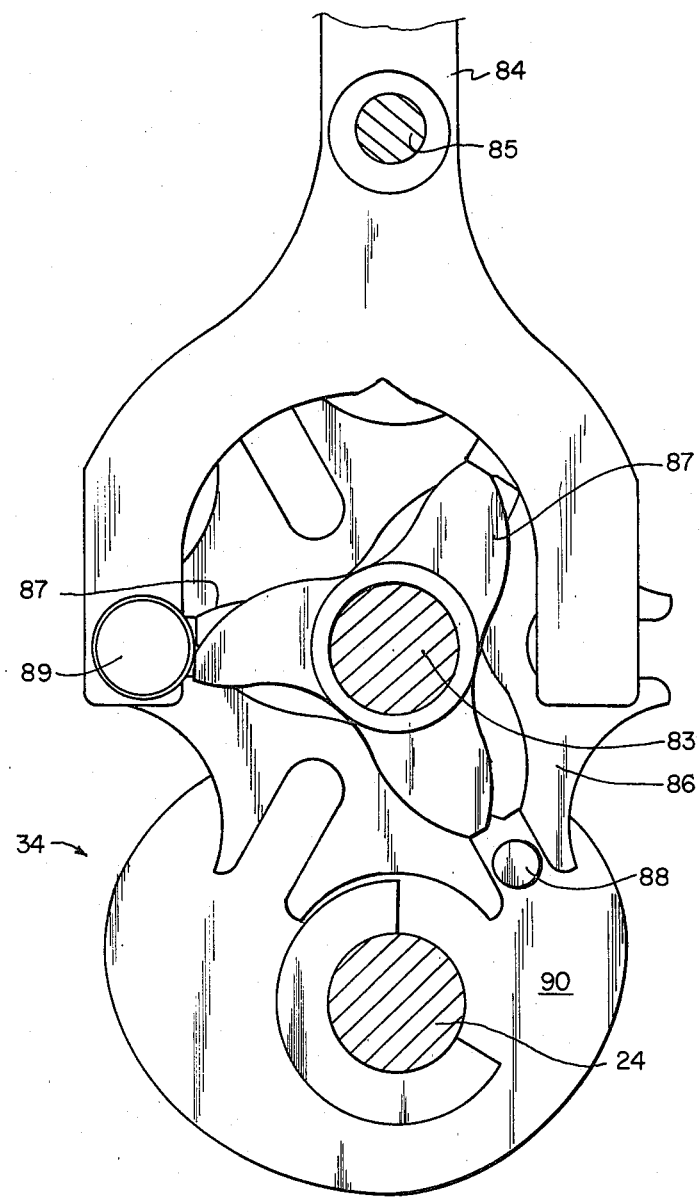
FIG. 3 is an elarged sectional view of the cam portion, looking from the back of the machine forwardly.

The upper housing 6 may also have disposed therein an arm 74 (FIG. 1) which is pivotally mounted on the sleeve member 58 and further pivotally connected to a linking member 76 which is itself pivotally mounted on a bolt 78 anchored in the upper housing. A pair of separated and interconnected flanges 80 (as shown in FIG. 1) are disposed on a shaft 82 proximate the pivot connection between the linkage member 76 and the arm 74. A lever 84 is positioned between the flanges 80, the lever 84 being pivotally mounted on a pin 85 (FIG. 3). Mounted on a cam shaft 83 proximate a bifurcated lower end of the lever 84 is a sprocket 86 engageable by a pin 88 carried by a cam member 90 of the cam assembly 34, the cam member 90 being fixed to the third shaft 24. Attached to the sprocket 86 is a series of cam fingers 87. Mounted on one of the lower ends of the lever 84 is a roller 89. As the third shaft 24 rotates, the pin 88 engages the sprocket 86 with each revolution. Engagement of the sprocket 86 by the pin 88 causes rotation of the fingers 87, one of the fingers 87 engaging the roller 89 to cause the lever 84 to move pivotally about the pin 85, its upper end (FIG. 1) urging the flanges 80 to move along the shaft 82. The flanges 80, in turn, engage the linkage member 76, causing the linkage member 76 to pivot about its mounting 78 and causing the arm 74 to pivot about the sleeve member 58. The free end of the arm 74 has pivotally mounted therein a vertical rod 92 which, at its lower end is fixed to a grinding wheel head assembly 94. Thus, the pivotal, or rocking, movement of the arm 74 causes the head assembly 94 to move alternately between first and second positions, to facilitate grinding of alternate facets on consecutive teeth of a rotary blade being sharpened. The flanges 80 may be rotated by a lever 93 (FIG. 4) so as not to engage the linkage member 76 and thereby remove the alternate grinding feature when such feature is not desired.

The upper housing 6 supports a grinding head shaft 96 (FIG. 1) on which is mounted the grinding wheel head assembly 94, including a grinding wheel 98. An electric motor 100 (FIG. 4) operates a drive belt 102 which in turn rotates the grinding wheel 98. The grinding head shaft 96 is bolted to a housing 101. A vertical shaft 103 is fixed at one end to the arm 62 and at the other end is threadedly connected to the housing 101. Thus, the shaft 96 is moveable vertically with the arm 62 in response to operation of the cam assembly 34, the housing 101 moving vertically with the shafts 96, 103.

Figure 5:
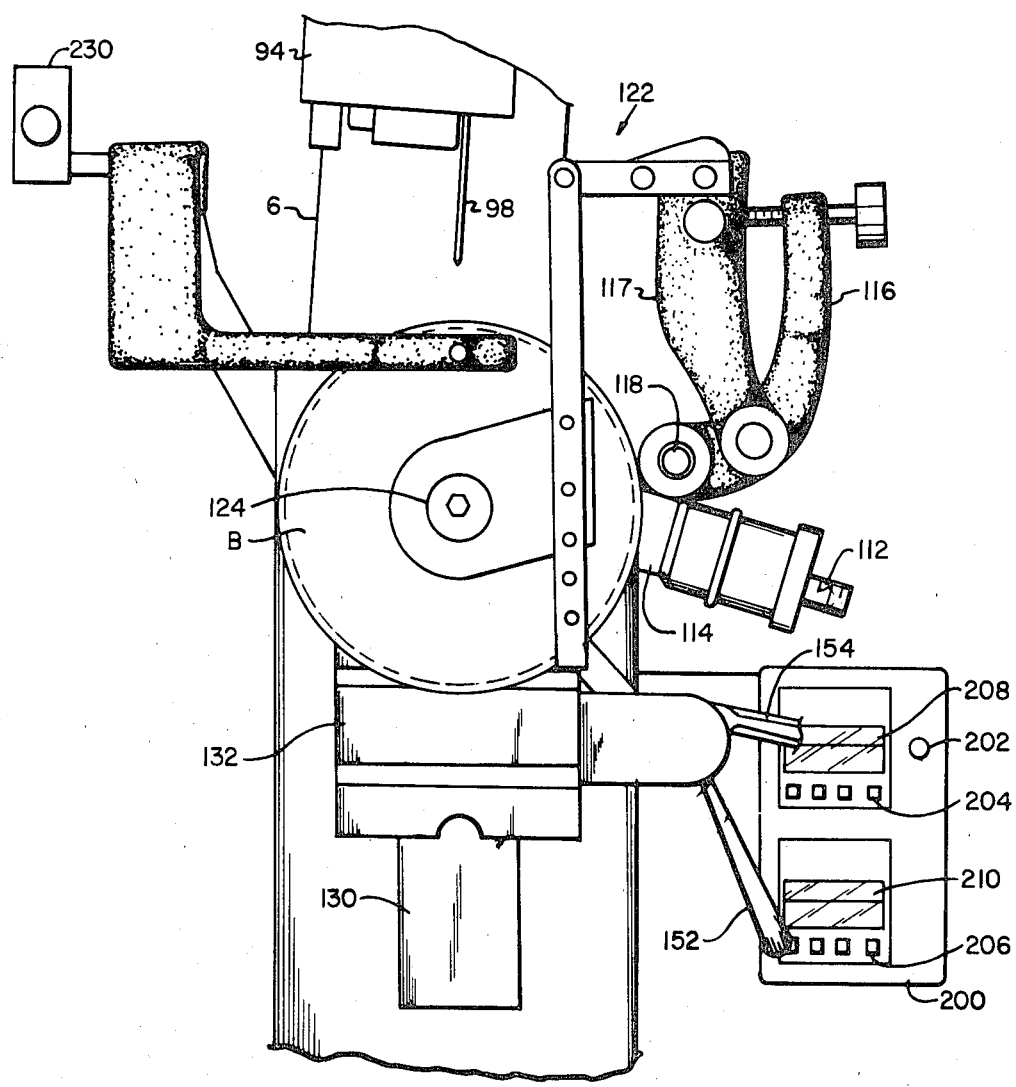
FIG. 5 is a front elevational view of a portion of the machine.

A second rocker arm 104 (FIGS. 1 and 2) is mounted in the lower housing 2 and carries a cam follower 106 engaged with the periphery of the cam member 90, or selectively, as illustrated, another cam member 108 of the cam assembly 34. The second rocker arm 104 includes a flat cam surface 105 (FIG. 2) on its underside on which rides a cam follower 110 mounted on a threaded spindle 112 screwed into a rocker 114 (FIG. 5) which is fixedly connected to a lever 116 by way of a rod 118. An advance pawl assembly 122 is attached to a lever 117 pivotally mounted on the lever 116 and is operable to urge a blade tooth through a selective distance.

Figure 7:
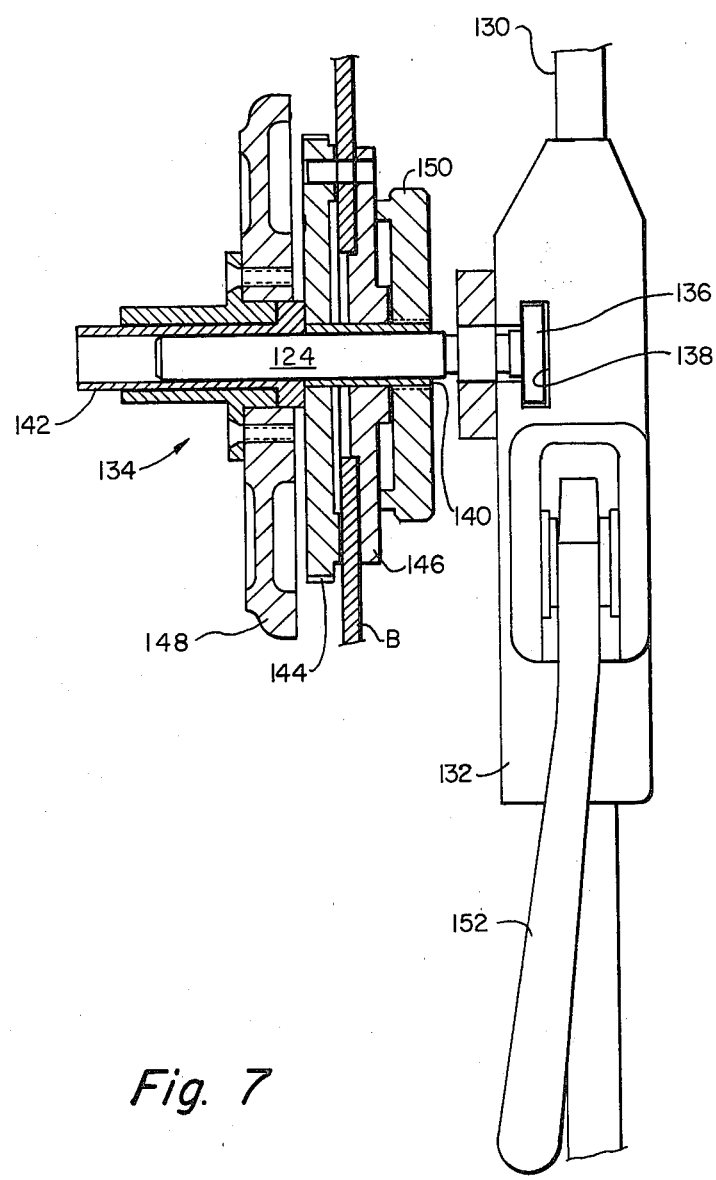
FIG. 7 is a sectional view of a blade attaching portion of the apparatus.
Figure 8:
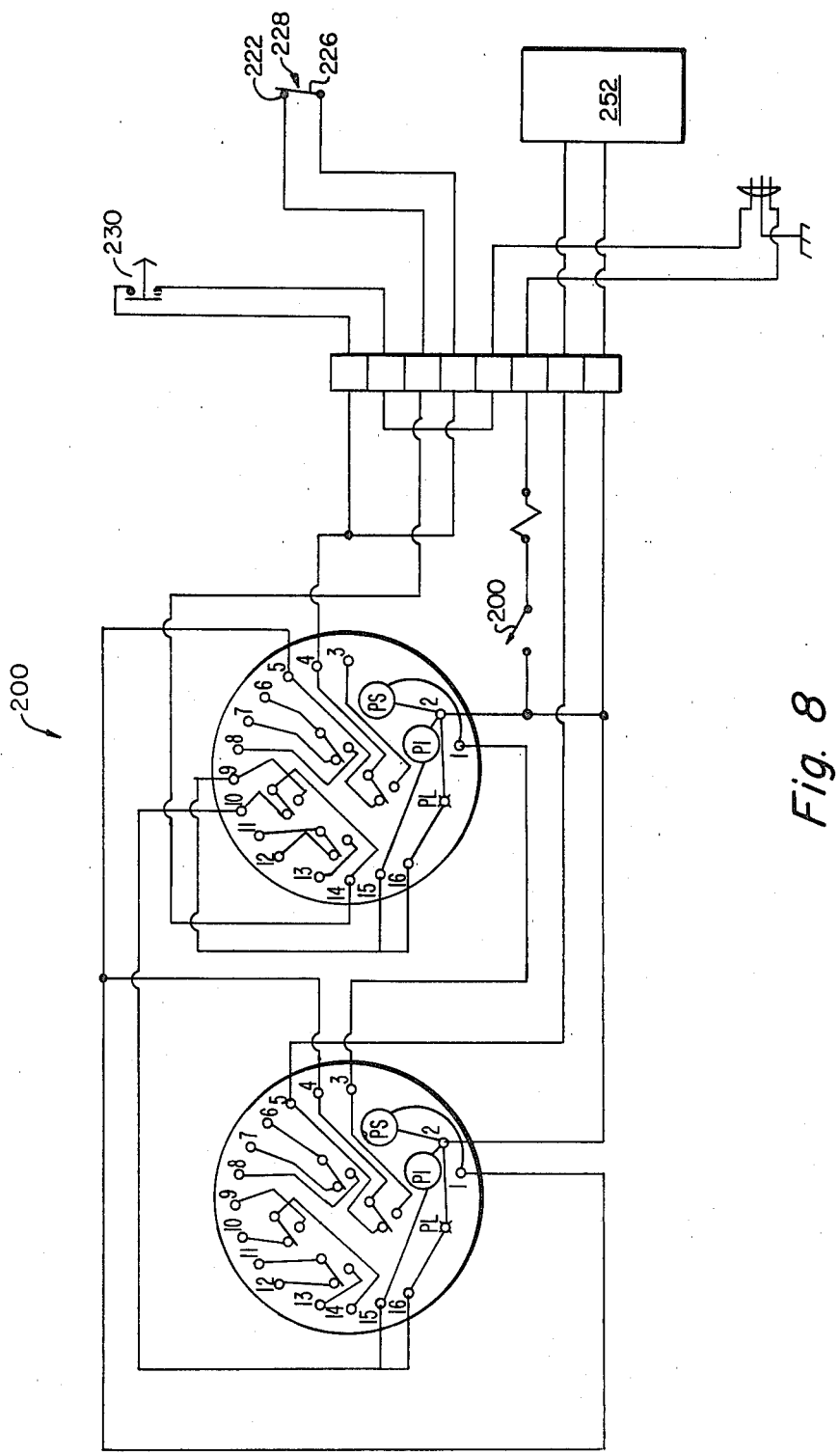
FIG. 8 is a diagrammatic view of the electrical circuitry of the inventive portion of the apparatus.

A vertical slide 130 is disposed on the lower housing 2 and has mounted thereon a carriage 132 adapted to support a blade holding assembly, an example of which 134 is illustrated in FIG. 7. The assembly includes a spindle 124 fixed to the carriage 132 by a tongue 136 in groove 138 arrangement. Disposed on the spindle 124 is a first sleeve member 140 and a second sleeve member 142. The blade B is held securely between an index plate 144 and an adapter plate 146, the latter being in part disposed in the central opening of the blade, the index plate 144 and adapter plate 146 being mounted on the sleeve 140, and bounded, respectively, by a cover member 148 and a lock nut 150. The index plate 144 comprises part of the blade advancement mechanism, as is known in the art. A first lever 152 serves as a lock handle and operates to lock the blade holding assembly 134 in place, and a second lever 154 serves to raise and lower the carriage 132 on the slide 130.

As described above, a first reciprocating grinding wheel lift mechanism dictates the vertical movement of the grinding wheel 98, the tilting movement of the grinding wheel, and the incremental advancement of the rotary blade 13, all being synchronized by receiving their movement directions from the cam assembly 34. In operation, the pawl assembly operates through the index plate 144 to advance a blade tooth, the blade being rotatively disposed on a spindle 124 a distance equal to a tooth width. The grinding wheel engages a first facet on the tooth, then lifts from engagement with the blade and the pawl assembly brings another blade tooth into position for sharpening. The grinding wheel then descends and shifts to engage a second facet of the new tooth. That is, a given tooth will be ground on a first side and the next tooth on a second side.

As thus far described, the machine is known in the art and is well adapted for sharpening of ordinary rotary saws.

Figure 9:
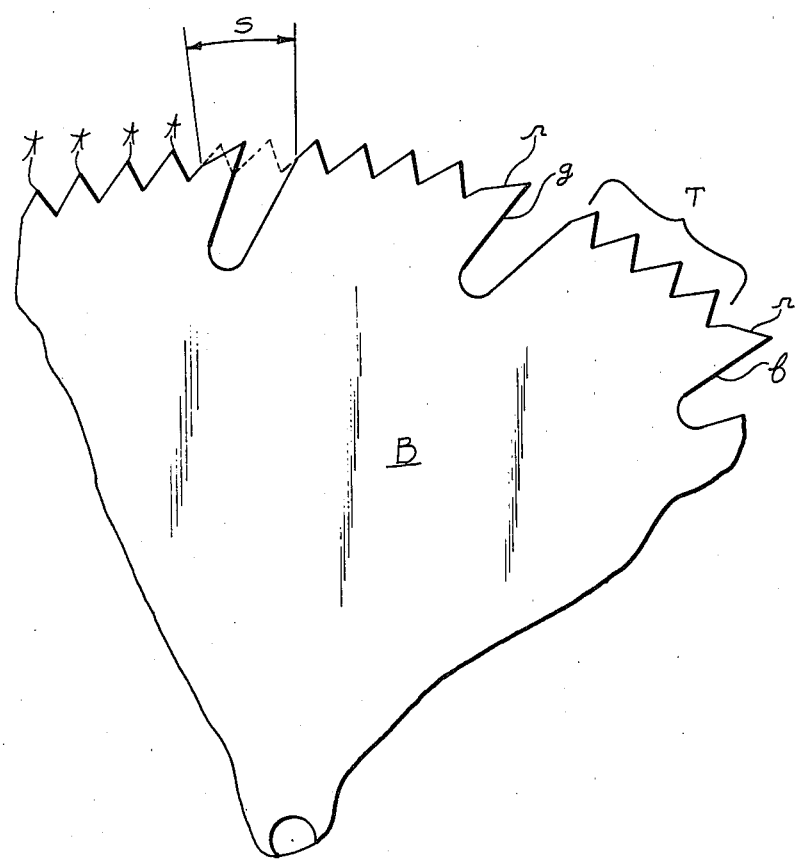
FIG. 9 is a partial elevational view of a saw blade of the type to be sharpened on the machine described herein.

In accordance with the present invention, the machine as above described is provided with a selector 200 (FIG. 5) having an "on-off" switch 202 and first and second manual input means 204, 206, preferably comprising arrays of push buttons and provided with digital displays 208, 210 showing numbers selected by an operator. In operation, the operator enters in the first input means 204 of the selector 200 the number of cutting teeth t in a group of cutting teeth T on the blade B to be sharpened (FIG. 9), plus 1. Thus, in the illustrated example, the operator would enter the number 5, which would be shown on the first digital display 208. The operator then enters in the second input means 206 of the selector 200 the number of cutting tooth spaces s occupied by a raker tooth r and a gullet g, less 1. Thus, in the illustrated example, the operator would enter the number 1, which would be shown on the second digital display 210.

Figure 6:
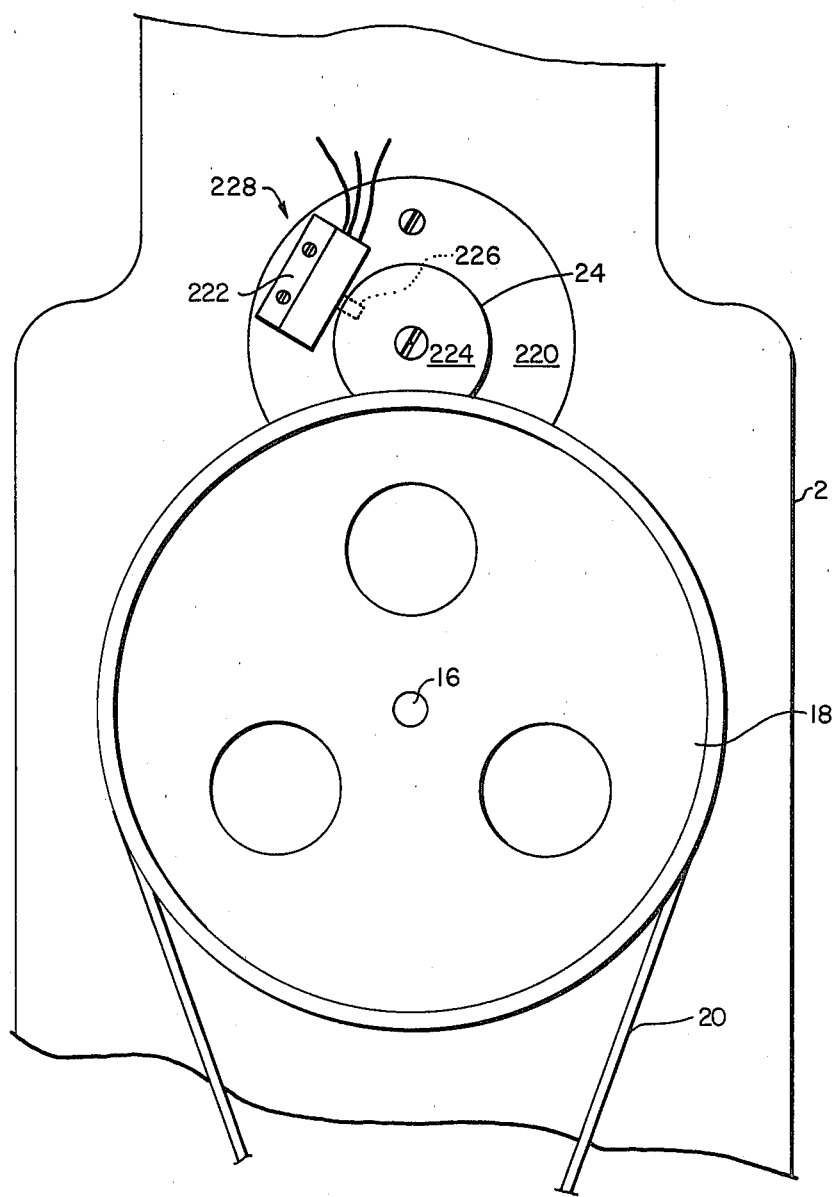
FIG. 6 is a back elevational view of another portion of the machine.

Attached to the upper housing 6 and about the third shaft 24 is a collar 220 (FIG. 6) having mounted thereon a proximity sensor 222, which sensor is in electrical communication with the selector 200. Fixed to an end of the third shaft 24 is a disc 224 having therein a magnet 226 which is exposed at the periphery of the disc. As the shaft 24 and disc 224 rotate, the proximity sensor 222 is activated by the proximity of the magnet 226 once per shaft revolution. The sensor 222 and magnet 226 thus constitute a counter means 228 operable to count a number of revolutions made by the third shaft 24.

A re-set switch 230 (FIG. 5) is provided which is manually operable and which operates to electrically block out the selector 200 and counter means 228 while the third shaft 24 is turning, as will be further described below.

Fixed to the upper housing 6 of the machine is a second lift mechanism including an air cylinder 240 having therein a piston 242 having extending therefrom a piston rod 244 connected to the vertical shaft 60. As noted above, the shaft 60 has mounted thereon the collar 61 engageable with an undersurface of the transverse arm 62. Upward movement of the piston rod 244 causes upward movement of the shaft 60 and thereby the collar 61, operating to lift the transverse arm 62, and thereby the grinding wheel head assembly 94.

In operation, the operator mounts the rotary blade B on the machine and starts the machine. The selector "on-off" switch 202 is turned to "on" and appropriate entries are made on the selector means 200, as above described. A lever 250, which operates to keep the grinding wheel assembly in a raised position, is eased to permit descent of the grinding wheel. As the lever 250 is moved, the reset switch 230 is depressed by the operator. As the blade moves through the grinding station, the operator synchronizes the release of the reset switch 230 to permit the grinding wheel to engage a forward edge e of a tooth t which is first of the group T of such teeth. The grinding wheel rises and descends to grind each succeeding tooth t, as well as a forward edge portion f of the trailing raker r, in accordance with the dictates of the first lift mechanism. With the grinding of each tooth t, the counter mechanism 228 electrically signals the first input means 204 until the number entered in the first input means is reached, which coincides with the passing through the grinding station of the last tooth t of the group T of such teeth. Thereupon, the first input means 204 electrically signals a solenoid switch 252 to operate a pneumatic valve 254 to energize the second lift mechanism of the air cylinder 240 to raise the transverse arm 62 and thereby the grinding wheel head assembly 94. The head assembly 94 remains in the raised position while the signals of the counter means 228 are registered in the second input means 206. When the number of electrical signals from the counter means 228 to the second input means 206 equals the number pre-set in the second input means, which will coincide with the passing of the raker and gullet of the blade through the grinding station, the second input means electrically signals the solenoid switch 252 to operate the air cylinder 240 to permit lowering of the transverse arm 62 and engagement of the grinding wheel with the first of a following group of cutting teeth, and return of the grinding wheel to control of the first lift mechanism.

Thus, a machine of the type described above, equipped with the improvements herein described, is capable of sharpening combination rotary blades, as well as the traditional rotary blades.

It is to be understood that the present invention is by no means limited to the particular construction herein disclosed and/or shown in the drawings, but also comprises any modifications or equivalents within the scope of the disclosure.

Having thus described our invention, what we claim as new and desire to secure by Letters Patent of the United States is:

1. Apparatus for sharpening a combination saw blade, the apparatus including a selector means for manual input of numbers of cutting teeth and non-cutting tooth spaces on the saw blade, a counter means for counting the number of teeth and tooth spaces moved to a grinding station, said grinding station having a grinding head disposed therein and mounted on a first reciprocating lift mechanism activated by a cam to sharpen each of said blade teeth serially, and a second lift mechanism adapted to operate in response to a signal from said counter to locate said grinding head out of a grinding position when said grinding station is occupied by one of said non-cutting tooth spaces, and to place the grinding head under control of the first lift mechanism when said grinding station is occupied by a cutting tooth.

2. Apparatus for sharpening a rotary combination saw blade, said apparatus comprising selector means for manual input of a number related to the number of cutting teeth serially arranged in a group on a peripheral portion of said blade and for manual input of a number related to the number of spacings disposed between adjacent groups of cutting teeth, each of said spacings being occupied by other than cutting teeth and being equivalent to a space occupied by one of said cutting teeth, a counter means adapted to count the number of said spaces and said spacings rotatively and incrementally carried by movement of a shaft to a grinding position for contact with a reciprocally moveable grinding head, and a grinding head moving means adapted to operate in response to a signal from said counter to locate said grinding head out of said grinding position when said grinding position is occupied by one of said spacings, and to permit said grinding head to be located in said grinding position when said grinding position is occupied by one of said teeth.

3. Apparatus for sharpening a rotary combination saw blade, said apparatus being adapted for attachment to an automatic sharpening machine, said sharpening machine comprising a rotatable shaft, mounting means operatively connected to said shaft for receiving and retaining a rotary saw blade, means for rotating said shaft incrementally to bring each cutting tooth to said blade into a grinding station, a reciprocally mounted grinding head moveable into and out of grinding position at said grinding station to sharpen each said cutting tooth in turn, said apparatus comprising selector means for manual input of a number related to the number of cutting teeth serially arranged in a group on a peripheral portion of said blade and for manual input of a number related to the number of spacings disposed between adjacent groups of cutting teeth, each of said spacings being occupied by other than cutting teeth and being equivalent to a space occupied by one of said cutting teeth, a counter means adapted to count the number of said spaces and said spacings rotatively and incrementally carried by movement of said shaft to a grinding position for contact with a reciprocally moveable grinding head, and a grinding head moving means adapted to operate in response to a signal from said counter to locate said grinding head out of said grinding position when said grinding position is occupied by one of said spacings, and to permit location of said grinding head in said grinding position when said grinding position is occupied by one of said teeth.

* * * * *